(12) United States Patent
Akiyama et al.

(10) Patent No.: US 11,092,967 B2
(45) Date of Patent: Aug. 17, 2021

(54) VEHICLE MOVEMENT CONTROL DEVICE

(71) Applicant: HITACHI AUTOMOTIVE SYSTEMS, LTD., Hitachinaka (JP)

(72) Inventors: Yuki Akiyama, Tokyo (JP); Junya Takahashi, Tokyo (JP); Toshiyuki Innami, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 297 days.

(21) Appl. No.: 16/325,367

(22) PCT Filed: Jul. 31, 2017

(86) PCT No.: PCT/JP2017/027611
§ 371 (c)(1),
(2) Date: Feb. 13, 2019

(87) PCT Pub. No.: WO2018/055916
PCT Pub. Date: Mar. 29, 2018

(65) Prior Publication Data
US 2019/0196487 A1    Jun. 27, 2019

(30) Foreign Application Priority Data

Sep. 23, 2016 (JP) .............................. JP2016-185433

(51) Int. Cl.
*G05D 1/02* (2020.01)
*B60W 10/04* (2006.01)
(Continued)

(52) U.S. Cl.
CPC ........... *G05D 1/0223* (2013.01); *B60W 10/04* (2013.01); *B60W 10/06* (2013.01); *B60W 10/08* (2013.01);
(Continued)

(58) Field of Classification Search
CPC ......... G05D 1/0223; G05D 2201/0213; G05D 1/0212; B62D 15/0255; B62D 6/003;
(Continued)

(56) References Cited

U.S. PATENT DOCUMENTS

2010/0082215 A1*  4/2010  Miyajima ......... B60W 50/0097
                                                    701/93
2012/0271512 A1* 10/2012  Rupp ..................... B62D 13/06
                                                    701/41
(Continued)

FOREIGN PATENT DOCUMENTS

JP    H10297516 A      11/1998
JP    2008290469 A  * 12/2008   ......... B60K 31/0066
(Continued)

OTHER PUBLICATIONS

International Search Report (along with its English Translation) and PCT Written Opinion (Japanese Language only) issued in corresponding application PCT/JP2017/027611 dated Oct. 24, 2017.

*Primary Examiner* — Rodney A Butler
(74) *Attorney, Agent, or Firm* — Foley & Lardner LLP

(57) ABSTRACT

The present invention provides a vehicle movement control device which is capable of achieving stable vehicle behavior during the movement of a vehicle in lane changing mode. When calculating a travel path for turning a vehicle to the left side or the right side and then turning the vehicle to the other side, this vehicle movement control device calculates the travel path so that the peak value of the curvature of the travel path decreases in a section where the vehicle speed is higher.

11 Claims, 12 Drawing Sheets

(51) Int. Cl.
- *B60W 10/20* (2006.01)
- *B62D 15/02* (2006.01)
- *B62D 6/00* (2006.01)
- *B60W 10/06* (2006.01)
- *B60W 30/02* (2012.01)
- *B60W 30/09* (2012.01)
- *B60W 40/11* (2012.01)
- *B60W 10/08* (2006.01)
- *B60W 30/10* (2006.01)
- *B60W 30/095* (2012.01)
- *B60W 40/114* (2012.01)

(52) U.S. Cl.
CPC ............ *B60W 10/20* (2013.01); *B60W 30/02* (2013.01); *B60W 30/095* (2013.01); *B60W 30/10* (2013.01); *B60W 40/114* (2013.01); *B62D 6/003* (2013.01); *B62D 15/0255* (2013.01); *B60W 30/09* (2013.01); *B60W 2520/125* (2013.01); *B60W 2710/06* (2013.01); *B60W 2710/205* (2013.01); *B60W 2710/207* (2013.01); *B60W 2720/10* (2013.01)

(58) Field of Classification Search
CPC ...... B60W 10/08; B60W 10/06; B60W 30/02; B60W 30/10; B60W 30/095; B60W 40/114; B60W 10/04; B60W 10/20; B60W 2720/10; B60W 30/09; B60W 2710/205; B60W 2710/207; B60W 2520/125; B60W 2710/06; B60W 30/18163; B60W 30/0956

See application file for complete search history.

(56) References Cited

U.S. PATENT DOCUMENTS

| | | | |
|---|---|---|---|
| 2013/0060414 A1* | 3/2013 | Lee ...................... | B62D 15/025 701/23 |
| 2016/0054133 A1* | 2/2016 | Mizuno ................. | G01C 21/20 701/400 |
| 2016/0264135 A1* | 9/2016 | Yamakado ........... | B60W 10/18 |
| 2016/0325721 A1* | 11/2016 | Jonasson ................ | B62D 6/003 |
| 2017/0247032 A1* | 8/2017 | Lee ...................... | B62D 15/025 |

FOREIGN PATENT DOCUMENTS

| | | |
|---|---|---|
| JP | 2009-040267 A | 2/2009 |
| JP | 2010-076584 A | 4/2010 |
| JP | 2014-076689 A | 5/2014 |
| JP | 2015-217848 A | 12/2015 |

\* cited by examiner

FIG. 6
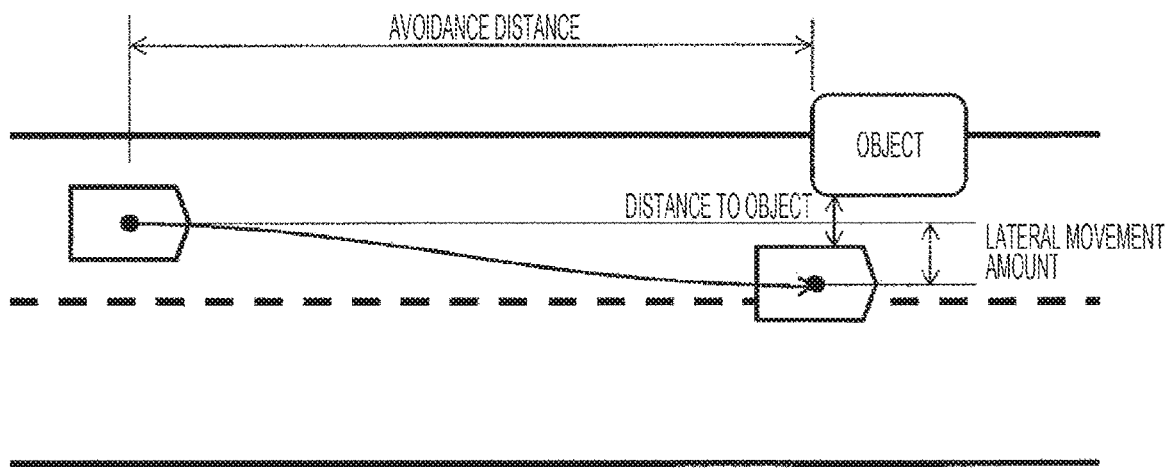
FIG. 7
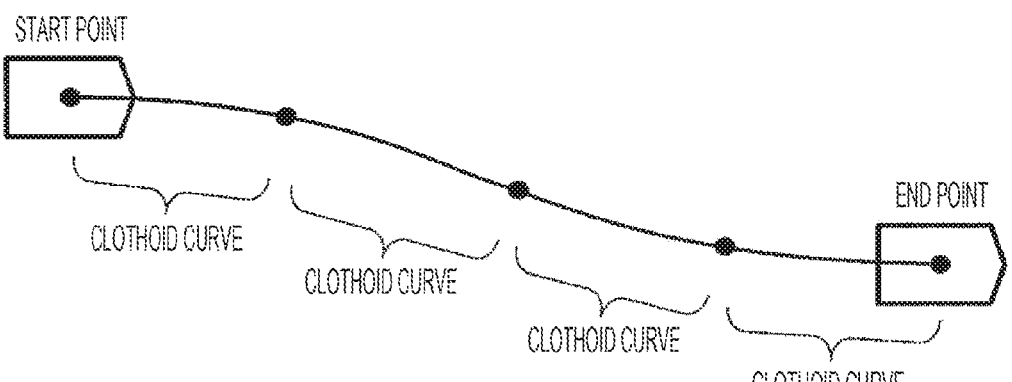
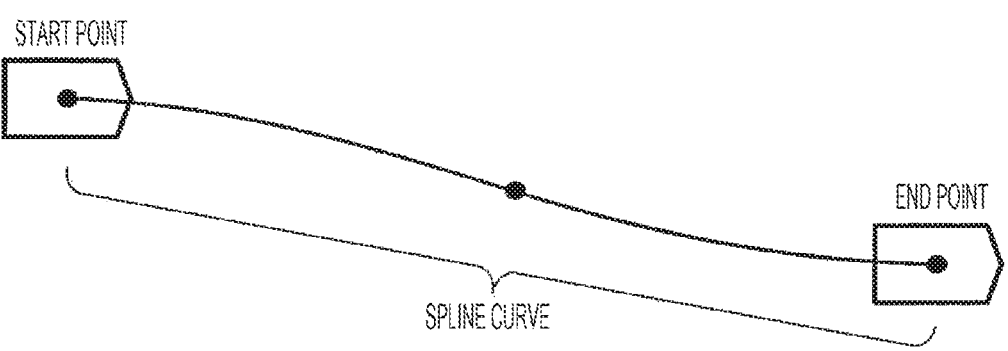

FIG. 17
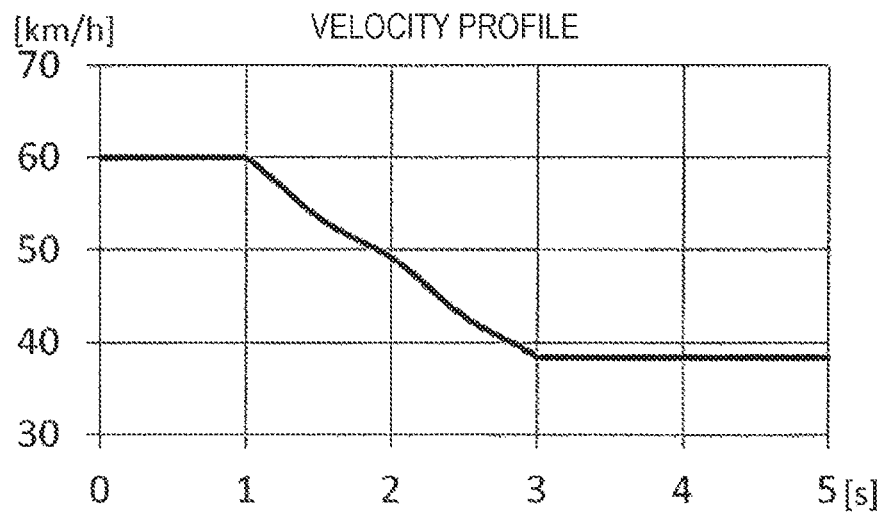
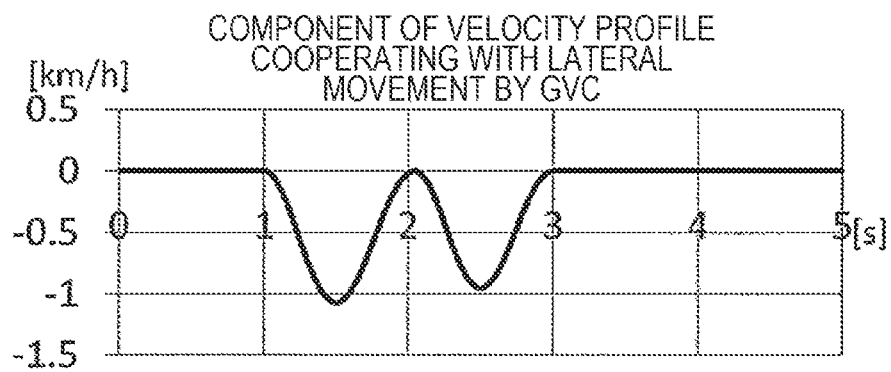
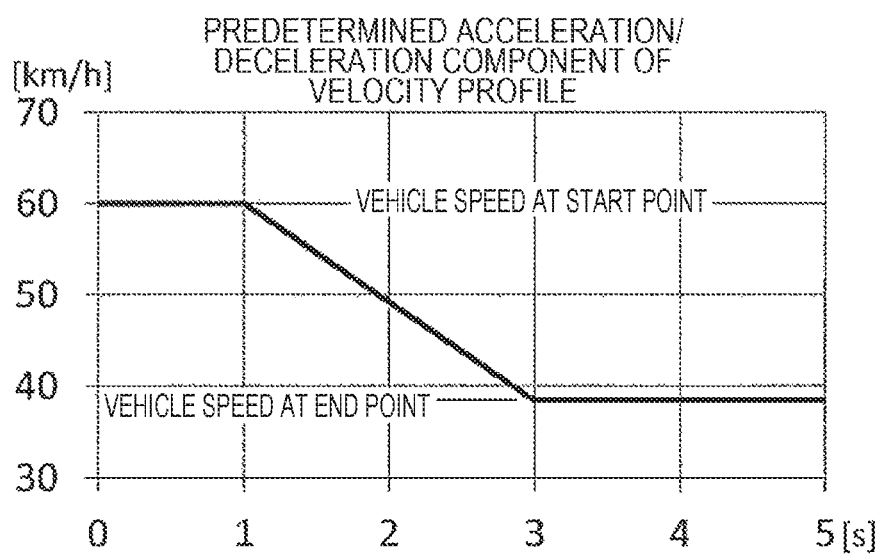

VEHICLE MOVEMENT CONTROL DEVICE

CROSS-REFERENCE TO RELATED APPLICATIONS

This application is a National Phase of International Patent Application No. PCT/JP2017/027611 filed on Jul. 31, 2017, which claims priority to Japanese Patent Application No. 2016-185433 filed on Sep. 23, 2016. The contents of these applications are herein incorporated by reference in their entirety.

TECHNICAL FIELD

The present invention relates to a vehicle movement control device for controlling the movement of a vehicle.

BACKGROUND ART

In recent years, advanced driving assistant system (hereinafter referred to as ADAS) and automatic driving related technologies have been developed rapidly in automobiles.

The technology of partially automating driving operation can be classified into controlling the longitudinal movement of a vehicle and controlling the lateral movement thereof. Examples of controlling the longitudinal movement include adaptive cruise control (ACC), an automatic emergency brake (AEB), and the like. The ACC and the AEB can respond to uncertain elements, such as other vehicles or obstacles. As controlling the lateral movement, lane keeping system (LKS), which is a technology for automatically steering along a lane or assisting steering, has been put into practical use.

The LKS is used to keep a lane, that is, to travel on a preset path, and cannot cope with a case where it is necessary to change the travel path. Lane change, emergency obstacle avoidance, merging, branching, and the like are assumed as a situation in which a travel path cannot be set in advance. In such a situation, the degree of freedom in selecting a travel path is higher than that in traveling in a lane, and it is necessary to set an appropriate travel path and control the movement of the vehicle to travel on the path. This technology is essential for smooth automatic operation drive on a general public road on which an uncertain change in situation is inevitable. In the ADAS as well, proper steering assistance is an important function in safety and security.

PTL 1 described later discloses a technology for controlling vehicle movement. In PTL 1, a method of setting a travel path for vehicle movement in a lane changing mode including obstacle avoidance is described.

CITATION LIST

Patent Literature

PTL 1: JP 2009-040267 A

SUMMARY OF INVENTION

Technical Problem

The path in the lane changing mode described in PTL 1 is a path in which the smoothness of the curve is considered. However, a resultant acceleration of longitudinal and lateral accelerations is not taken into consideration, and an inertial force on an occupant may become excessive. Thus, there is room for improvement of ride comfort. Likewise, due to the resultant acceleration of longitudinal and lateral accelerations, a force exerted on the vehicle may be excessive, resulting in a deviation from a set path and unstable vehicle behavior.

The present invention has been made in view of the above problems, and an object of the present invention is to provide a vehicle movement control device capable of achieving stable vehicle behavior during the movement of a vehicle in a lane changing mode.

Solution to Problem

When calculating a travel path for turning a vehicle to the left side or the right side and then turning the vehicle to the other side, the vehicle movement control device according to the present invention calculates the travel path so that the peak value of the curvature of the travel path decreases in a section where the vehicle speed is higher.

Advantageous Effects of Invention

The present invention achieves a vehicle movement control device which reduces a peak value of a resultant acceleration of longitudinal and lateral accelerations, for stable vehicle behavior. Problems, configurations, and effects other than those in the above description will be made clear in the following descriptions of the embodiments.

BRIEF DESCRIPTION OF DRAWINGS

FIG. 6 is a diagram illustrating a lateral movement amount in a case where driving into an oncoming lane or across a road shoulder occurs for overtaking or obstacle avoidance on a road with one lane in each direction.

FIG. 7 is a diagram illustrating a conventional method of setting a lane change path.

FIG. 17 illustrates graphs indicating an example of a velocity profile calculated by using G-Vectoring control.

DESCRIPTION OF EMBODIMENTS

First Embodiment

Figure 1:
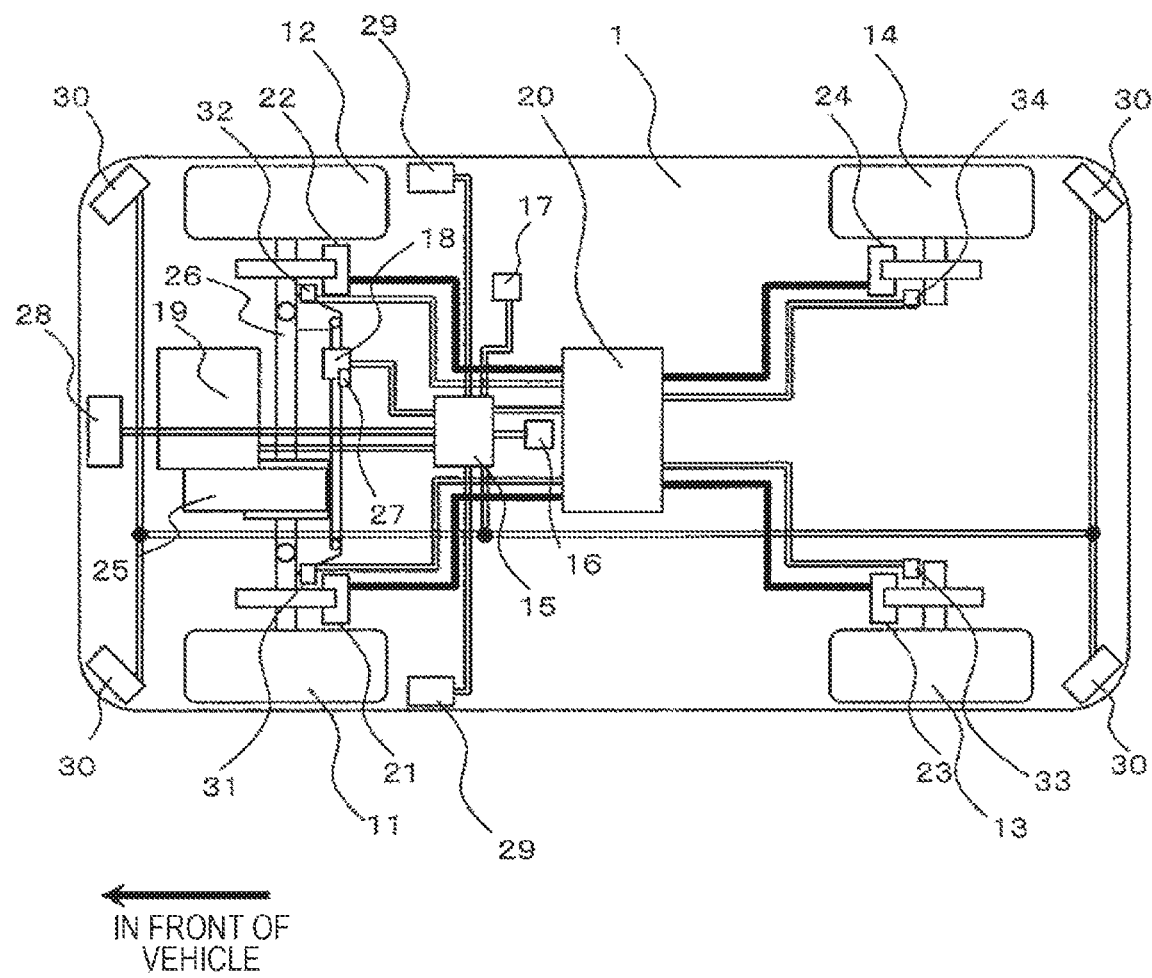
FIG. 1 is a configuration diagram of a vehicle 1 in which an automatic driving system according to a first embodiment is mounted.

FIG. 1 is a configuration diagram of a vehicle 1 in which an automatic driving system according to a first embodiment is mounted. The term "automatic driving system" used herein represents a mode in which the system may simultaneously control steering and acceleration/deceleration. For example, the automatic driving system represents an automatic lane change system triggered by a driver's instruction, an automatic braking and steering avoidance system used only in an emergency, and a fully automatic driving system without bothering a driver. The vehicle 1 is configured to control steering and acceleration/deceleration on the basis of a control command from a vehicle movement control device 15 without depending on the driver's operation.

A steering device 18 includes an electric power steering (EPS). In addition to the function of the power steering for amplifying the driver's steering force, the EPS has a function of receiving a control command transmitted from the vehicle movement control device 15 to serve as an active actuator for steering a left front wheel 11 and a right front wheel 12 without depending on the driver's operation.

A drive device 19 includes an internal combustion engine, an electric motor, or both thereof, receives a control command transmitted from the vehicle movement control device 15, and causes the left front wheel 11 and the right front wheel 12 which are driving wheels to generate a driving force via a decelerator 25 and a drive shaft 26, causing the vehicle 1 to travel. Furthermore, the drive device 19 causes each of the driving wheels to generate a braking force to decelerate the vehicle 1. In accordance with the control command, the drive device 19 can control the acceleration/deceleration without depending on the driver's operation.

The brake control device 20 has a function of receiving a control command transmitted from the vehicle movement control device 15 to apply hydraulic pressure to brake devices 21 to 24, and controlling braking force. In accordance with the control command, the brake control device 20 can control deceleration without depending on the driver's operation. The brake devices 21 to 24 operate upon receiving the hydraulic pressure from the brake control device 20, and generate a braking force on each of four wheels 11 to 14.

The vehicle movement control device 15 receives information input from a Global Navigation Satellite System (GNSS) sensor 17, an inertial sensor 16, a camera 28 for acquiring external information in front of the vehicle, side image sensors 29, laser scanners 30, and wheel speed sensors 31 to 34 (via the brake control device 20). On the basis of the information, the vehicle movement control device 15 sends control commands to the steering device 18, the drive device 19, and the brake control device 20 to control the movement of the vehicle 1.

As a brake/drive device, the brake devices 21 to 24 and the drive device 19 may control the braking force in cooperation with each other. The steering device 18 may be constituted by a steering mechanism and a steering control device, and similarly, the configurations of the other devices may be divided from or integrated with each other.

Figure 2:
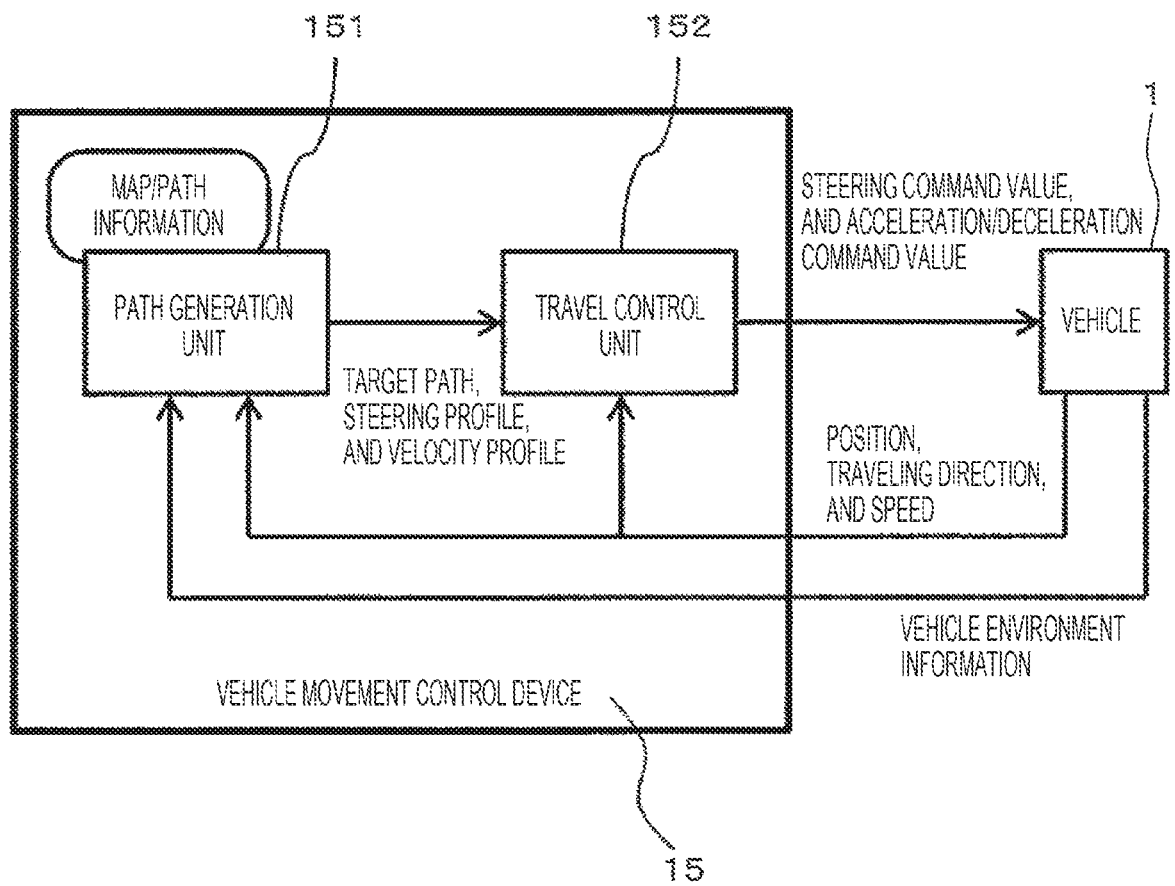
FIG. 2 is an internal configuration diagram of a vehicle movement control device 15.

FIG. 2 is an internal configuration diagram of the vehicle movement control device 15. The vehicle movement control device 15 includes a path generation unit 151 and a travel control unit 152.

The path generation unit 151 receives input of external information acquired in real time from the camera 28 capturing an image in front of the vehicle, information about a three-dimensional object around the vehicle obtained by each of the laser scanners 30, and the current position, traveling direction, and speed of the vehicle. The path generation unit 151 holds map information acquired in advance and information of a predetermined travel path generated in advance on the basis of the map information, as road curve shape information including lane width. The path generation unit 151 integrates information detected by the GNSS sensor 17, the inertial sensor 16 for detecting acceleration and angular velocity, the wheel speed sensors 31 to 34, a steering angle sensor 27, and each of the side image sensors 29 for detecting the lane or road edge, and the position, traveling direction, and speed of the vehicle are acquired highly accurately.

The path generation unit 151 detects a travelable range, and when it is necessary to deviate from a predetermined path, the path generation unit 151 dynamically generates a travel path. The path generation unit 151 selects either the dynamically generated path or the predetermined path according to a situation and outputs the selected path as a target path to the travel control unit 152 together with a corresponding steering profile and velocity profile. The steering profile means a transition in steering angle with respect to a time, and the velocity profile means a transition in vehicle speed with respect to a time.

In addition to the input of the target path, the steering profile, and the velocity profile output by the path generation unit 151, the current position, traveling direction, and the speed of the vehicle are input to the travel control unit 152. The travel control unit 152 calculates and transmits a steering command value according to feedforward control based on the steering profile, to an actuator of the steering device 18 so as to follow the target path, and further detects a deviation from the target path of the vehicle for feedback control. At the same time, on the basis of the velocity profile, the travel control unit 152 calculates an acceleration/deceleration command value or a speed command value, transmits the calculated acceleration/deceleration command value or speed command value to the drive device 19 and the brake control device 20, and controls acceleration/deceleration or speed.

Next, a framework of vehicle movement control during travel in a lane changing mode will be described. The lane changing mode represents a state in which a series of vehicle movements, such as movement from a lane to an adjacent lane or lateral movement by a distance equal to the movement to the adjacent lane, is made continuously from a right turning zone to a left turning zone or from the left turning zone to the right turning zone. The vehicle movements in the lane changing mode include merging, branching, overtaking, avoidance of obstacles, and the like, in addition to lane change on a road with multiple lanes in each direction. In these scenes, unlike traveling along a predetermined lane, it is necessary to select or generate an appropriate path to travel therein according to the surrounding situations.

Basically, it is assumed that the vehicle 1 travels along the predetermined travel path, but if necessary, it is assumed that the vehicle 1 dynamically sets a travel path or steering profile to temporarily deviate from the predetermined travel path and return to the predetermined travel path again.

In most cases, temporal deviation from a static predetermined path includes zones being a travel path as in the lane changing mode in which a steering wheel is turned left and right successively. Therefore, the vehicle movement control device 15 generates a path in the zones and controls the vehicle 1 to follow the generated path.

Since there is a certain degree of freedom in the travelable range which allows traveling while avoiding contact or collision with another other vehicle or an obstacle, it is necessary to determine a travel path along which automatic driving is made. In order to detect the travelable range, a stereo camera, a laser scanner, various radars, or a combination thereof with a monocular camera which is capable of detecting the size of the other vehicle or obstacle as an object and a relative positional relationship between the object and the vehicle 1 is used, and if necessary, map information for detecting a road edge or lane is also used.

Figure 3:
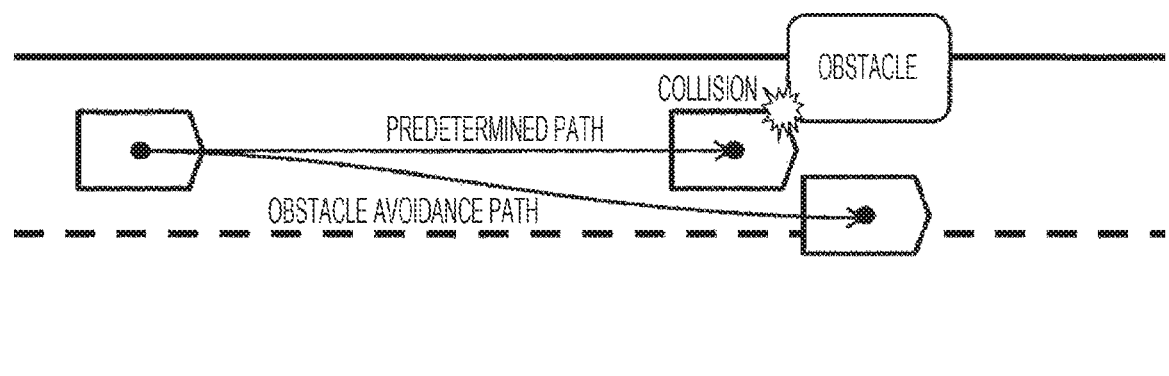
FIG. 3 is a diagram illustrating an example in which a travel path needs to be set dynamically.

FIG. 3 is a diagram illustrating an example in which a travel path needs to be set dynamically. For example, as illustrated in FIG. 3, when a host vehicle traveling at a certain speed passes by a front obstacle, which is located close at a distance shorter than braking distance while deviating the predetermined path by automatic steering to avoid a collision with the obstacle, it is necessary to dynamically set the travel path.

Figure 4:
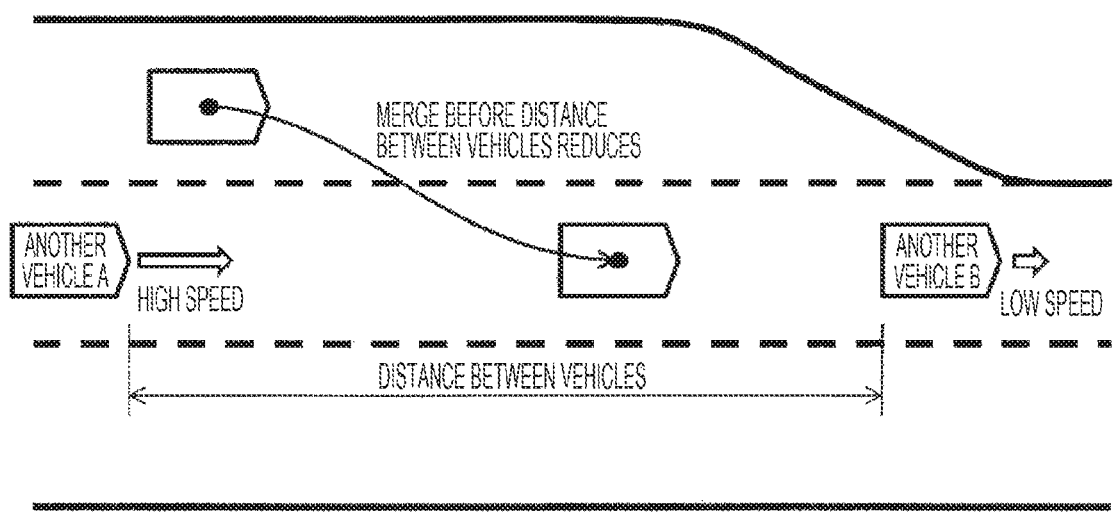
FIG. 4 is a diagram illustrating another example in which a travel path needs to be set dynamically.

FIG. 4 is a diagram illustrating another example in which the travel path needs to be set dynamically. As illustrated in FIG. 4, in a case where the merging lane merges into a main lane of an expressway and it is safe for a vehicle to move to the main lane while controlling the speed thereof before reaching the end of the merging lane on the basis of a positional and velocity relationship of the vehicle to other vehicles traveling on the main lane, it is necessary to dynamically set the travel path. As exemplified in FIGS. 3 and 4, as a situation requiring dynamic setting of the travel path, various situations which the predetermined travel path cannot deal with are expected.

In any of the lane changing modes, in order to reduce the risk of collision and mitigate damage when collision cannot be avoided, not only setting the path for securing a distance relative to the object but also small relative speed between the vehicle and the object are desirable. Furthermore, in movement characteristics of the vehicle, lower speed allows the vehicle to turn with a larger curvature, and the vehicle movement in the lane changing mode generally involves acceleration/deceleration.

A process of control in which the vehicle movement control device 15 generates a lane change path and causes the vehicle 1 to travel along the path will be described. First, it is determined whether shift to travel in the lane changing mode is required during traveling on the predetermined path, on the basis of surrounding situations and the detected travelable range described above. When it is determined that shift to travel in the lane changing mode is required, input information necessary for control is set. The input information includes avoidance distance, lateral movement amount, and current vehicle speed. For the sake of convenience, the avoidance distance represents a movement distance in a longitudinal direction until the lateral movement of the lane changing mode is completed. The lateral movement amount represents a movement distance in a lateral direction until the lateral movement of the lane changing mode is completed. In a case where the traveling direction needs to be different at the start and the end of the lane change, the information thereof is also added. The current position is a lane change start point, and a point moved from the lane change start point by the avoidance distance and the lateral movement amount is a lane change end point.

Figure 5:
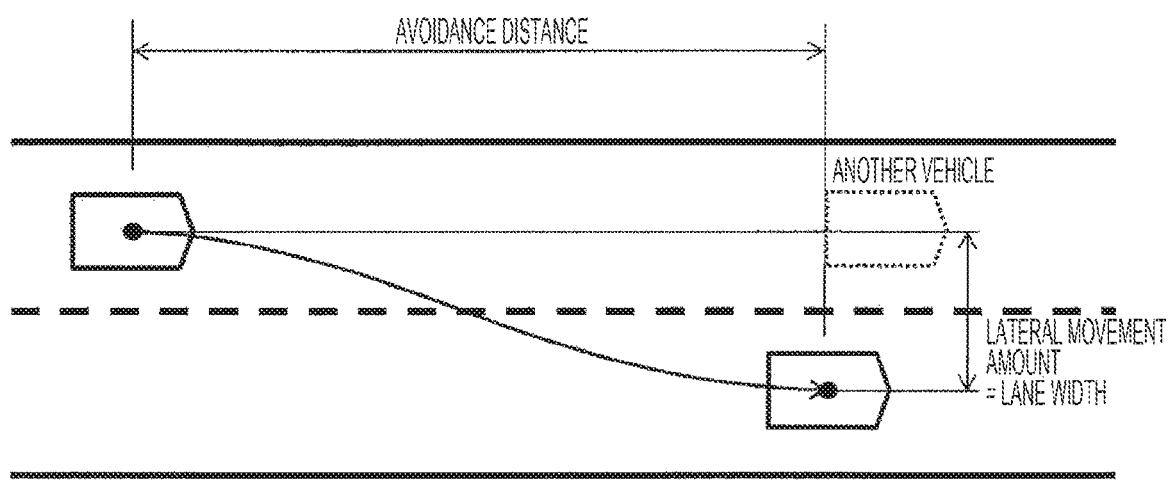
FIG. 5 is a diagram illustrating a lateral movement amount in a lane change for the purpose of moving to an adjacent lane.

FIG. 5 is a diagram illustrating a lateral movement amount in a lane change for the purpose of moving to an adjacent lane. In this case, the lateral movement amount corresponding to a lane width is set so that the lane change end point is located in an adjacent lane. For such a zone of a road with multiple lanes in each direction, predetermined travel paths are preferably prepared simultaneously for the respective lanes to allow setting the lane change end point to any of these predetermined travel paths.

FIG. 6 is a diagram illustrating a lateral movement amount in a case where driving into an oncoming lane or across a road shoulder occurs for overtaking or obstacle avoidance on a road with one lane in each direction. In this case, a lateral movement amount having a minimum allowance is set to the distance between the object and the vehicle 1.

FIG. 7 is a diagram illustrating a conventional method of setting a lane change path. Conventionally, as a policy to set the lane change path, it has been general to keep lateral acceleration and not to generate excessive lateral acceleration. To keep the lateral acceleration, continuous curvature of the travel path is preferably required, and to prevent generation of the excessive lateral acceleration, the avoidance distance is preferably made as long as possible relative to the lateral movement amount. In the two methods illustrated in FIG. 7, on the basis of these principles, a start point and an end point of a lateral movement are connected by clothoid curves or various spline curves.

To the contrary, the present invention is the same as the conventional method in that the avoidance distance is made as long as possible relative to the lateral movement amount, but the shape of a path along which the vehicle should travel is determined in detail in consideration of not only the lateral acceleration but also acceleration/deceleration generated in the vehicle.

In the present invention, acceleration/deceleration is controlled by superimposing a longitudinal acceleration cooperating with the lateral movement on a predetermined longitudinal acceleration. It has been found that the longitudinal acceleration desirably changes in response to lateral jerk both in terms of vehicle dynamic performance and ride comfort. In the present invention, the longitudinal acceleration is determined by using G-Vectoring control which achieves this relationship.

Formula 1 described below is a basic formula of the G-Vectoring control. In this formula 1, $G_x$ is a longitudinal acceleration, $G_y$ is a lateral acceleration, $dG_y/dt$ is a jerk being a time rate of change in lateral acceleration, $C_{xy}$ is a G-Vectoring control gain, and $G_{x\_DC}$ is a longitudinal acceleration component independent of lateral movement.

$$G_x = -\text{sgn}(G_y \cdot dG_y/dt) \cdot C_{xy} \cdot dG_y/dt + G_{x\_DC} \qquad (1)$$

The first term on the right side of formula 1 represents a longitudinal acceleration obtained by multiplying the lateral jerk by the gain, and giving a sign to decelerate when the magnitude of the lateral acceleration increases and accelerate when the lateral acceleration decreases.

The second term on the right side of formula 1 is a predetermined longitudinal acceleration given when acceleration/deceleration is required regardless of the lateral movement.

The following formula 2 is an expression showing an approximate relationship between steering angle, vehicle speed, and lateral acceleration. δ is a steering angle, V is a vehicle speed, and $C_G$ is proportionality constant based on a simple linear model of vehicle movement.

$$G_y = \delta V^2 C_G \quad (2)$$

As shown in formula 2, a lateral acceleration $G_y$ generated in the vehicle has a substantially linear relationship with the steering angle δ. Therefore, when non-smooth steering is performed, discontinuous longitudinal acceleration is generated due to a lateral acceleration change, according to formulas 1 and 2. In order to take advantage of the effect of the G-Vectoring control, it is desirable that the magnitude of the steering speed is continuous so that the longitudinal acceleration according to the steering is smoothly changed. Therefore, in the present invention, a steering profile is generated based on a pattern in which the steering speed changes continuously. Considering ease of handling in arithmetic processing of a control program, a pattern in which transition of the steering angle forms a sinusoidal shape is desirable.

Figure 8:
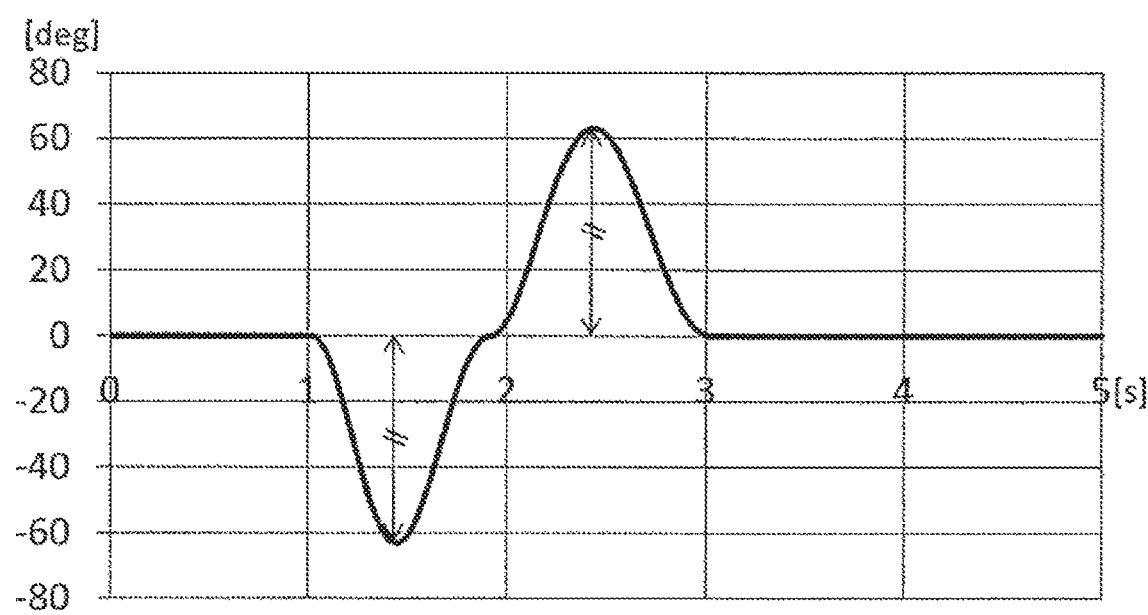
FIG. 8 is a graph indicating an example of a sinusoidal steering profile in which the magnitude of steering speed continuously changes in a lane change path.

FIG. 8 is a graph indicating an example of a sinusoidal steering profile in which the magnitude of steering speed continuously changes in a lane change path. When the steering profile and an initial vehicle speed are determined, the acceleration/deceleration according to the lateral movement is determined by the G-Vectoring control. The velocity profile is determined by superimposing, on this acceleration/deceleration, a predetermined acceleration/deceleration giving a speed change required until the end of the lane change. As the steering profile and the velocity profile, steering and braking/driving are input to the vehicle, and the travel path is determined.

When the G-Vectoring control is used, a resultant acceleration of longitudinal and lateral accelerations generated in the vehicle is also affected by the shape of the travel path. Therefore, a relationship between the shape of the ravel path and the resultant acceleration of longitudinal and lateral accelerations generated in the vehicle will be described below.

Figure 9:
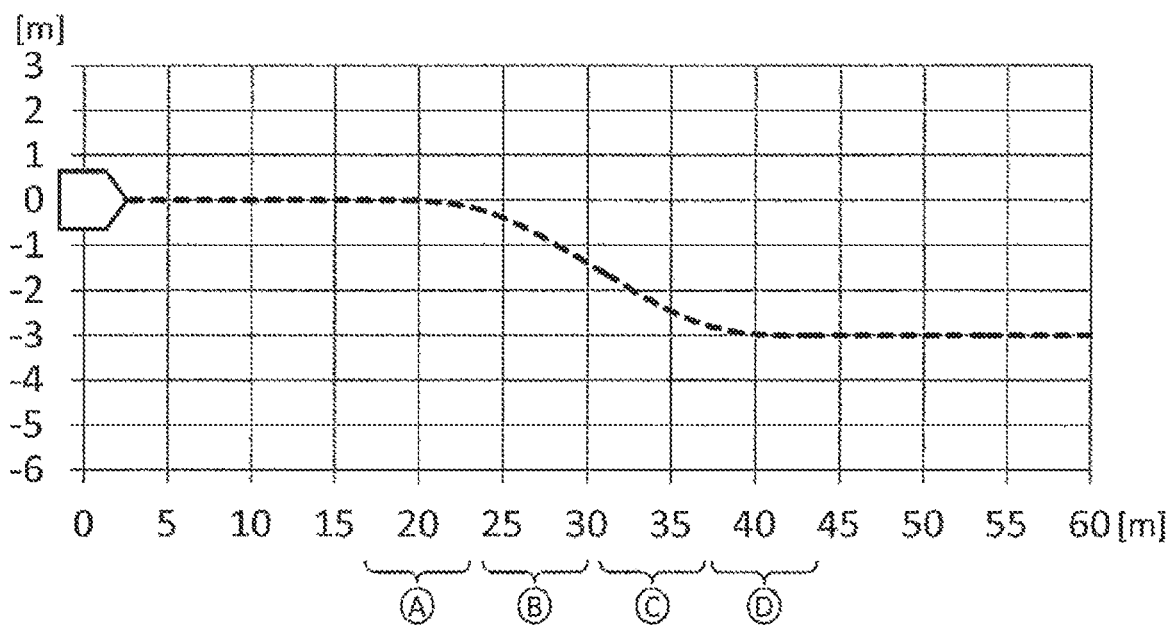
FIG. 9 is a graph indicating an example of a point-symmetrical lane change path.

FIG. 9 is a graph indicating an example of a point-symmetrical lane change path. The travel path illustrated in FIG. 9 is calculated based on a sinusoidal steering profile, and the right turning zone and the left turning zone are point symmetrical about the midpoint of the path. Traveling in such a path at different vehicle speeds between the right turning zone and the left turning zone differs left and right lateral accelerations. In addition, at this time, the longitudinal acceleration is controlled by the G-Vectoring control, and the longitudinal acceleration is determined for changes in different lateral accelerations, and thus, resultant acceleration of longitudinal and lateral accelerations also differs between the right turning zone and the left turning zone. Even when the travel path has a clothoid curve or a spline curve, the resultant acceleration of longitudinal and lateral accelerations will be different between the right turning zone and the left turning zone, as in the point-symmetrical path. For example, when a lane change to the right is made while decelerating, the magnitude of the resultant acceleration of longitudinal and lateral accelerations is larger in the first half, that is, a right turning zone A to B than that in the second half, that is, a left turning zone C to D.

Figure 10:
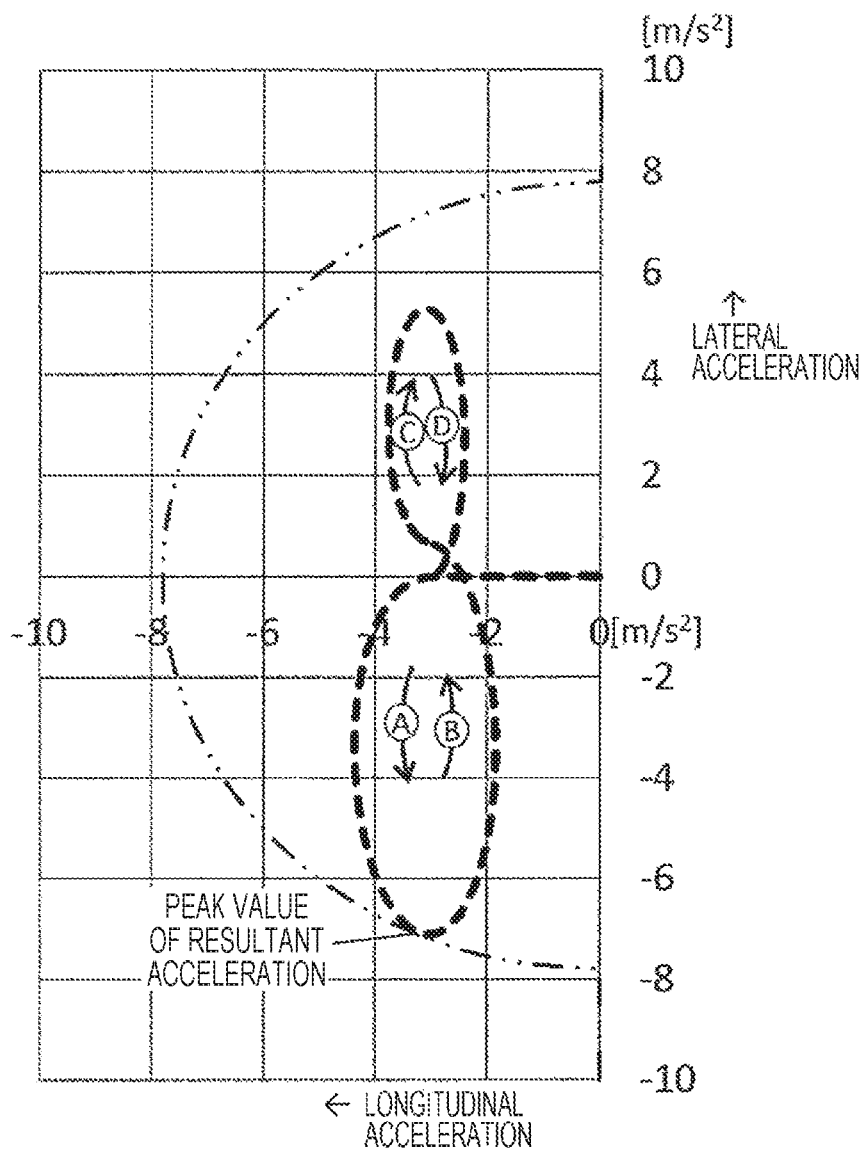
FIG. 10 is a graph indicating results of principle estimation of a "g-g" diagram obtained on the basis of the travel path illustrated in FIG. 9.

FIG. 10 is a graph indicating results of principle estimation of a "g-g" diagram obtained on the basis of the travel path illustrated in FIG. 9. A change in the resultant acceleration of longitudinal and lateral accelerations will be described while comparing the respective zones illustrated in FIG. 10 with the travel path illustrated in FIG. 9.

Formula 1 includes a deceleration component not cooperating with the lateral movement and wholly superimposed. Therefore, at a starting point of the travel path of FIG. 9, the lateral acceleration is 0 and the longitudinal acceleration appears on the deceleration side. Then, in the first half of the right turning zone, the lateral acceleration to the right increases and the deceleration increases with the action of the G-Vectoring control (A). In a process of return steering from the right turning, the lateral acceleration to the right decreases and the deceleration decreases due to the action of the G-Vectoring control (B).

In the second half of the left turning zone, as the lateral acceleration to the left increases and the deceleration increases by the action of the G-Vectoring control, as in the right turning zone, but the vehicle speed decreases compared with that in the right turning zone. Thus, the lateral acceleration is small and increases relatively slowly. Therefore, the deceleration is smaller than that in the right turning zone (C). Even in a process of return steering from the left turning, the lateral acceleration returns to 0 from a value smaller than that in the first half slowly compared with the first half. Therefore, a change in the deceleration is still smaller than that in the right turning zone (D).

The resultant acceleration of longitudinal and lateral accelerations in the first half of the right turning zone A to B being large although the resultant acceleration of longitudinal and lateral accelerations in the second half of the left turning zone C to D is small means that there is an excessive allowance in the second half and the resultant acceleration of longitudinal and lateral accelerations of the vehicle is excessive in the first half. Since the resultant acceleration of longitudinal and lateral accelerations corresponds to an inertial force acting on an occupant, there is room for improving the inertial force to obtain comfortable ride. Furthermore, the resultant acceleration of longitudinal and lateral accelerations corresponds to a force acting on the vehicle. Most of the force is generated between a road surface and a tire. Therefore, a lower limit value of the road surface t (friction coefficient) on which the vehicle is travelable along this path is determined according to a peak value in the right turning zone where the resultant acceleration of longitudinal and lateral accelerations is relatively large.

Figure 11:
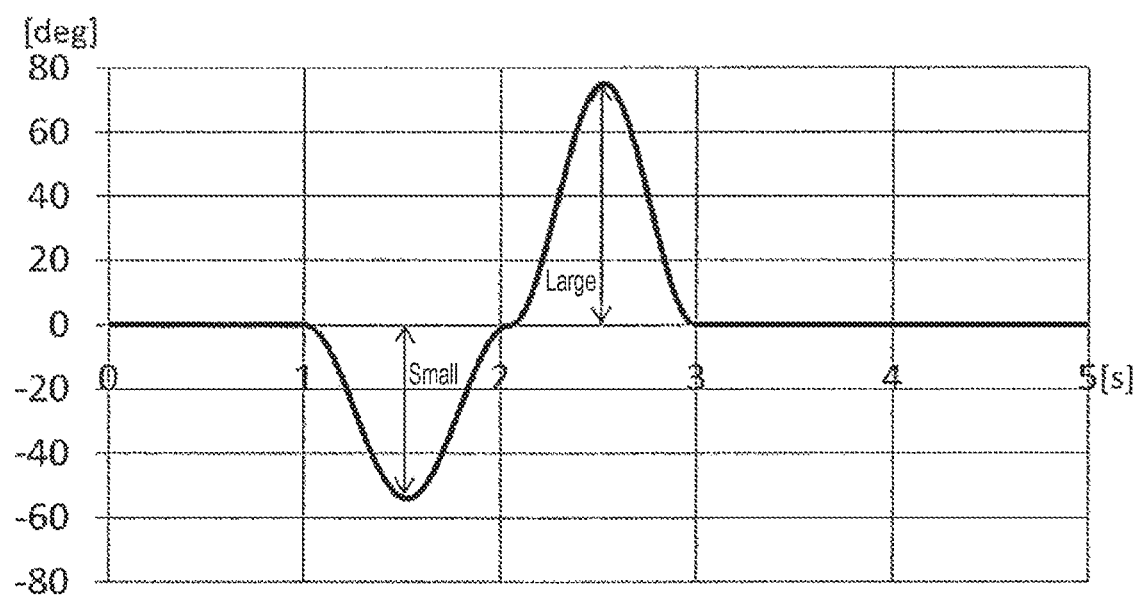
FIG. 11 is a graph indicating an example of a steering profile according to the present invention.

FIG. 11 is an example of a steering profile according to the present invention. According to the present invention, in a travel path in which the left turning zone is generated after the right turning zone during the lane change, the maximum value of the steering angle in the right turning zone A to B is set smaller than the maximum value of the steering angle in the left turning zone C to D. Specifically, on the basis of the sinusoidal steering profile as illustrated in FIG. 8, the left and right steering angles are changed, and the steering speed in the right turning zone A and B is set smaller than the steering speed in the left turning zone C to D Late.

Figure 12:
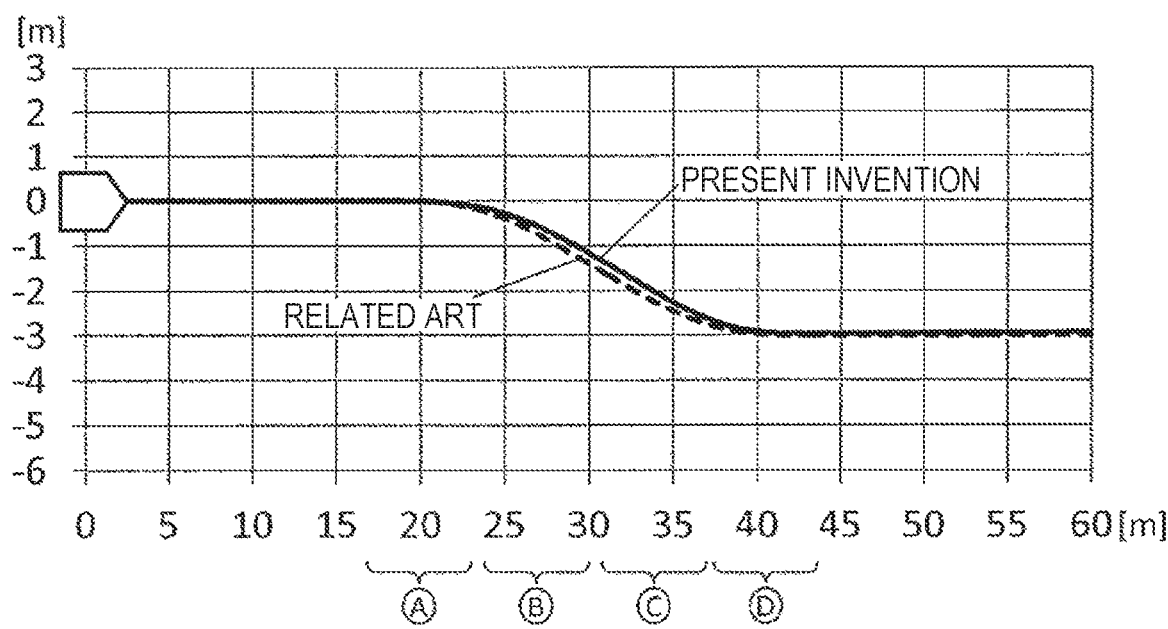
FIG. 12 is a graph indicating a travel path obtained from the steering profile of FIG. 11, overlaid on the point-symmetric path of FIG. 9.

FIG. 12 is a diagram illustrating a travel path obtained from the steering profile of FIG. 11, overlaid on the point-symmetric path of FIG. 9. Here, it is assumed that lane change to the right is made while decelerating, as in FIG. 9.

The travel path in the present invention is not point symmetric and the peak values of the curvature of the travel path are smaller in the right turning zone A and B than in the left turning zone C to D. Thus, the vehicle speed in a zone having a small curvature is high and the vehicle speed in a zone having a large curvature is low. Therefore, appropriate adjustment of the curvature and vehicle speed makes the peak values of the resultant acceleration of longitudinal and lateral accelerations in the right turning zone A to B and the left turning zone C to D equal.

Figure 13:
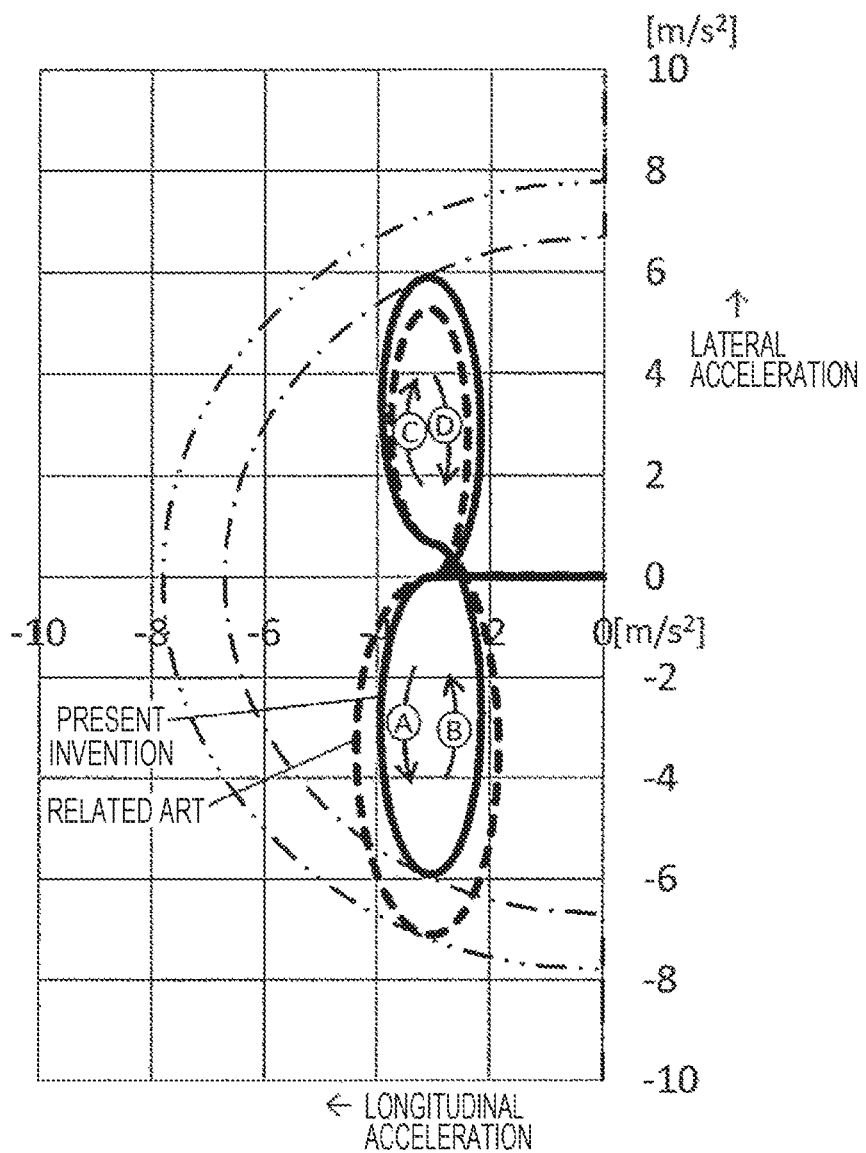
FIG. 13 is a graph indicating the "g-g" diagram indicating results of principle estimation in a case of traveling along the path illustrated in FIG. 12, overlaid on the results of estimation in a case of traveling along the point-symmetric path of FIG. 10.

FIG. 13 is a graph indicating the "g-g" diagram indicating results of principle estimation in a case of traveling along the path illustrated in FIG. 12, overlaid on the results of estimation in a case of traveling along the point-symmetric path of FIG. 10.

In any of the travel paths, it is common to make a lane change to the right while decelerating and to implement the G-Vectoring control.

In the present invention, both the lateral acceleration and the longitudinal acceleration become smaller in the right turning zone A to B than in the point symmetric path, and in the left turning zone C to D, the lateral acceleration and the longitudinal acceleration both become point symmetric paths It is comparatively bigger. Thus, the peak values of the resultant acceleration of longitudinal and lateral accelerations in the right turning zone A to B and the left turning zone C to D are substantially equal to each other. Therefore, the ride comfort is improved as compared with a travel path in which the peak values of the resultant acceleration of longitudinal and lateral accelerations in the right turning zone and the left turning zone are different from each other. Furthermore, since the lower limit value of the road surface (friction coefficient) on which the vehicle travelable along this path is determined according to the peak value of the resultant acceleration, a lane change is stably made even on a smaller road surface.

The longitudinal acceleration and the lateral acceleration are determined depending on a position on the travel path which the vehicle reaches per time. Therefore, in order to properly control the acceleration, it is important to run along a set path. Since the path generation unit 151 calculates the travel path on the basis of the steering profile and the velocity profile, when the vehicle movement model is sufficiently accurate, the vehicle can travel along a target path only by feedforward control of steering and acceleration/deceleration. However, a deviation is actually generated, and it is not always possible for pure feedforward control to run the vehicle along the target path with accuracy required to follow the target path. Therefore, in order to accurately follow the target path, it is necessary to use feedback control together.

Figure 14:
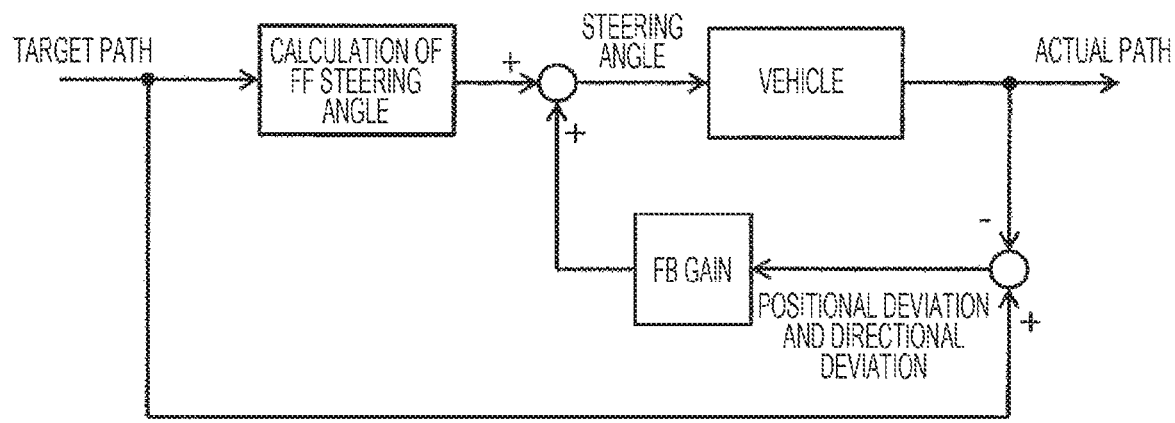
FIG. 14 is a control block diagram for causing a vehicle to follow a travel path.

FIG. 14 is a control block diagram for causing the vehicle to follow the travel path. This control block can be mounted to, for example, the travel control unit 152. This control block includes feedback control for suppressing deviation in lateral positional and angle in addition to the feedforward control for steering based on a predetermined steering profile.

In this control block, a general look-ahead model may be used by omitting the feedforward control based on the steering profile. However, in that case, since the information of the steering profile is not used, detailed adjustment may be required to ensure path following performance.

Figure 15:
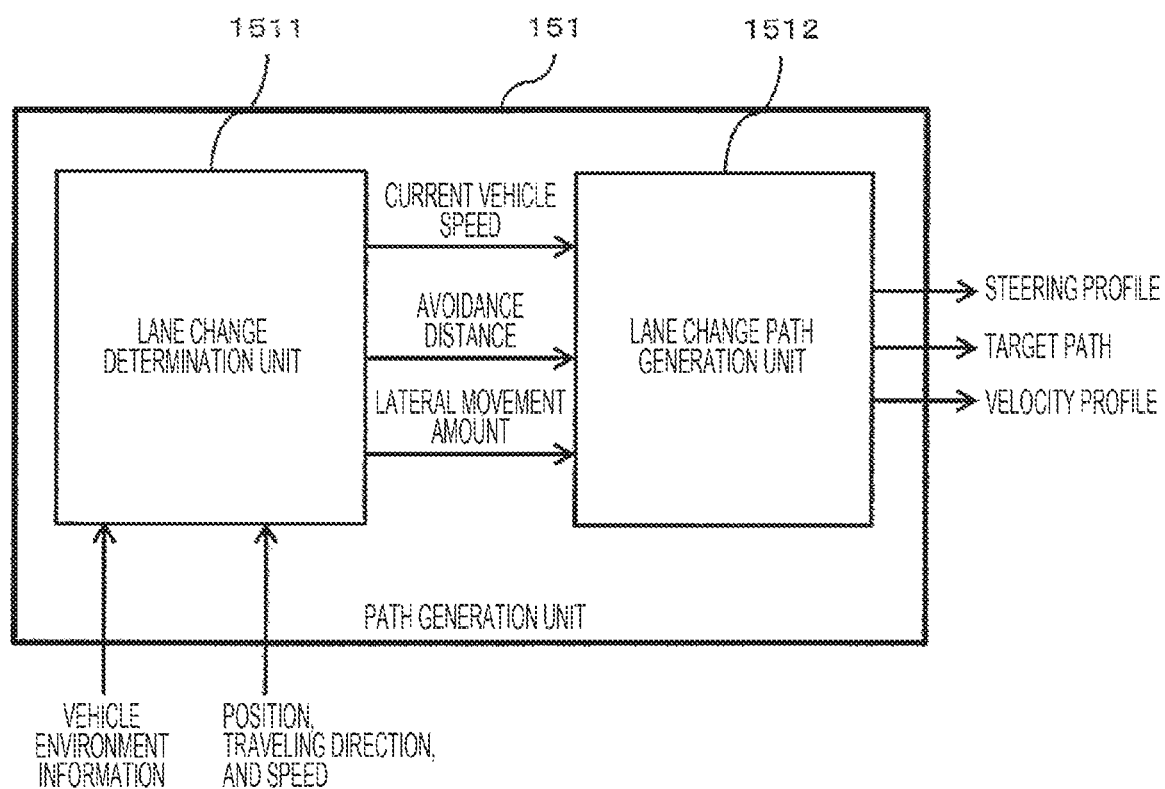
FIG. 15 is an internal configuration diagram of a path generation unit 151.

FIG. 15 is an internal configuration diagram of the path generation unit 151. A lane change determination unit 1511 receives vehicle environment information/position/traveling direction/speed as an input, calculates the avoidance distance and the lateral movement amount, and outputs the calculation results together with the current vehicle speed to a lane change path generation unit 1512. The lane change path generation unit 1512 calculates the steering profile/target path/velocity profile using the input information.

Figure 16:
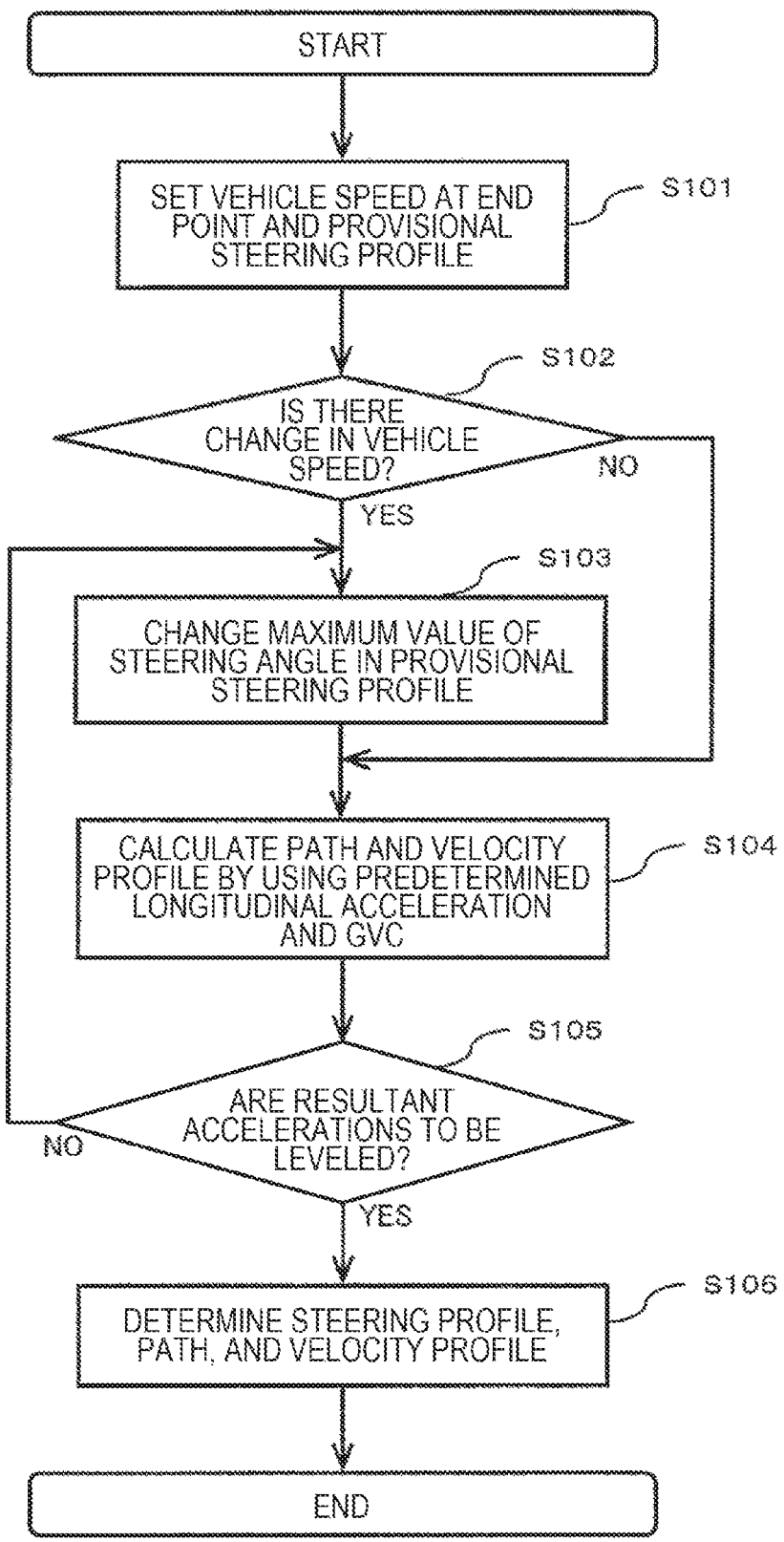
FIG. 16 is a flowchart illustrating a process performed by a lane change path generation unit 1512.

FIG. 16 is a flowchart illustrating a process performed by the lane change path generation unit 1512. Steps of FIG. 16 will be described below.

(FIG. 16: step S101)
The lane change path generation unit 1512 sets the vehicle speed at the lane change end point on the basis of the degree of acceleration/deceleration required independently of the lateral movement and further sets a provisional steering profile where left and right steering angles have an equal maximum value. This provisional steering profile resembles, for example, the steering profile as exemplified in FIG. 8.

(FIG. 16: step S102)
The lane change path generation unit 1512 determines whether the vehicle speed at the lane change start point and the vehicle speed at the lane change end point are different. When the vehicle speed at the end point is different from the vehicle speed at the start point, the process proceeds to step S103, and when the vehicle speeds are the same, the process skips to step S104. This is because when the vehicle speeds are the same, the peaks of the resultant accelerations are equal in the left and right turning zones, and performance of step S103 described later does not required.

(FIG. 16: step S103)
The lane change path generation unit 1512 changes the maximum values of the left and right steering angles in the provisional steering profile. For example, as illustrated in FIG. 12, the maximum values of the steering angles are changed so that the curvature of a zone of the travel path where the vehicle speed is large is reduced.

(FIG. 16: step S104)
On the basis of the provisional steering profile and formula 1, the lane change path generation unit 1512 calculates the travel path and the velocity profile where G-Vectoring control is applied.

(FIG. 16: step S105)
The lane change path generation unit 1512 determines whether the resultant acceleration of longitudinal and lateral accelerations in the left turning zone and the resultant acceleration of longitudinal and lateral accelerations in the right turning zone are to be leveled. When the resultant accelerations of longitudinal and lateral accelerations are leveled, the process proceeds to step S106, and when the resultant accelerations of longitudinal and lateral accelerations are not leveled, the process returns to step S103 and the same process is repeated.

(FIG. 16: Step S105: Supplementary note No. 1)
In this step, even if the peak values of the resultant accelerations of longitudinal and lateral accelerations in the left and right turning zones are not equal to each other, when a difference between the resultant accelerations of longitudinal and lateral accelerations in the left and right turning zones is reduced compared with a case where the left and right turning zones constitute the point-symmetrical path, it is considered that the peak values have been leveled. An extent of a difference between the peak values which is considered that the peak values have been leveled is preferably determined by using an appropriate threshold value.

(FIG. 16: Step S105: Supplementary note No. 2)
When the vehicle speed at the lane change start point is determined to be equal to the vehicle speed at the lane change end point in step S102, the peak values of the resultant accelerations of longitudinal and lateral accelerations are considered to be already leveled in this step.

(FIG. 16: step S106)

The lane change path generation unit 1512 adopts the provisional steering profile at that time as the steering profile and adopts the travel path and the velocity profile which have been calculated in step S104. The lane change path generation unit 1512 uses the provisional steering profile, the travel path, and the velocity profile as control targets.

FIG. 17 illustrates graphs indicating an example of the velocity profile calculated by using the G-Vectoring control. The second graph represents speed based on an acceleration/deceleration component calculated according to the lateral movement of the vehicle, and the speed is determined by the G-Vectoring control gain. The third graph represents speed based on an acceleration/deceleration component not cooperating with the lateral movement, and the speed is set to give a speed difference between the lane change start point and the lane change end point. The first graph represents the velocity profile finally used, and the first graph is obtained by combining the second and third graphs.

The acceleration/deceleration component of the third graph is not necessarily constant. However, when the acceleration/deceleration in the third graph is changed, the acceleration/deceleration is to be changed to have a cycle longer than the cycle of the left and right steering so as not to prevent the cooperation between the lateral movement and the longitudinal movement by the G-Vectoring control. At this time, the vehicle speed at the lane change end point may be set so that the acceleration/deceleration is determined to achieve the vehicle speed. Alternatively, the vehicle speed at the lane change end point may be determined as a result of setting the degree of acceleration/deceleration.

Use of the vehicle movement model enables calculation of the travel path of the vehicle and the resultant acceleration of longitudinal and lateral accelerations with predetermined acceleration/deceleration, sinusoidal steering, and acceleration/deceleration caused by the G-Vectoring control as parameters. Use of this calculation, it is possible to determine the steering frequency and the maximum values of the left and right steering angles in which a yaw angle matches the position of the vehicle at the lane change end point and the resultant accelerations of longitudinal and lateral accelerations are leveled between the first and second halves (i.e., amplitude of sinusoidal steering change), as an inverse problem, and the steering profile and the travel path at that time can be set as the control targets.

In practice, it is difficult to solve this inverse problem analytically. Thus, it is practical to calculate the path as a forward problem to search for an element satisfying a condition and adopt the element as the target path. As the policy of searching, when a lane change is made while accelerating the vehicle, increasing the maximum value of the turning steering angle in the first half relative to the maximum value of the turning steering angle in the second half, which is in the opposite direction to that in the first half, is preferably repeated, and when a lane change is made while decelerating, reducing the maximum value of the turning steering angle in the first half relative to the maximum value of the turning steering angle in the second half, which is in the opposite direction to that in the first half, is preferably repeated. In this search, a method of calculating the target path by using a simple vehicle movement model will be described below.

Figure 18:
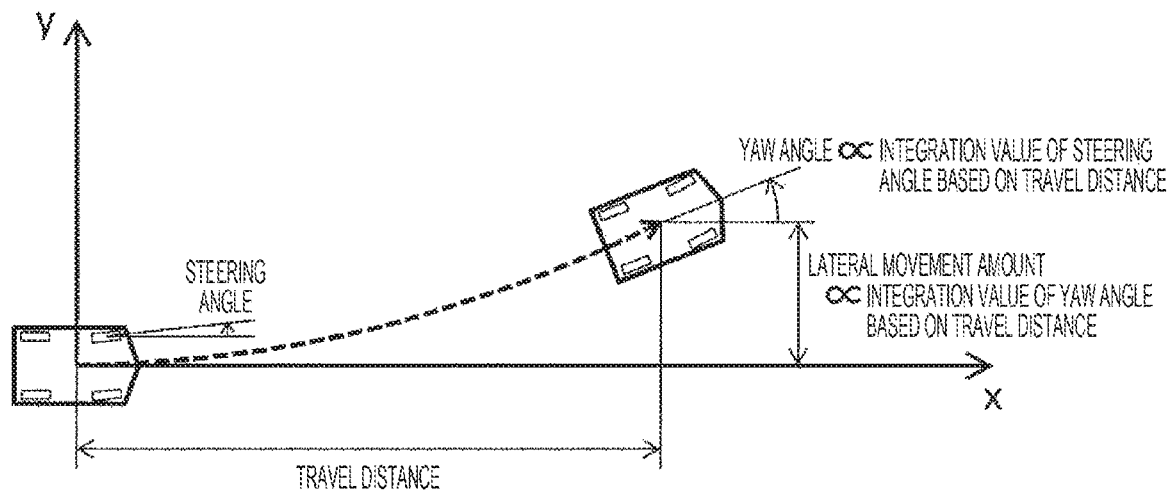
FIG. 18 is a graph indicating a vehicle movement model approximating to a change of a yaw angle during lane change, considering that a tire sideslip angle is small enough.

FIG. 18 is a graph indicating a vehicle movement model approximating to a change of the yaw angle during lane change, considering that a tire sideslip angle is small enough. In this model, an integration value of the steering angle based on the travel distance is defined as the yaw angle, and an integration value of the yaw angle based on the travel distance is defined as a lateral position. Therefore, the model can be considered as a simple relationship in which a double integration value of a steering angle based on a travel distance is the lateral position, and a calculation load is minimized.

Since the model is simple, there is a possibility that the transition of actual steering angle does not always form a sinusoidal shape due to fine steering correction or additional steering to follow the target path. However, when an actual path can sufficiently follow the target path by the feedback control following the path, it is considered that the transition of the resultant acceleration of longitudinal and lateral accelerations does not deviate considerably from a target value.

A more detailed vehicle movement model can be used depending on the calculation performance of the control device. For example, a planar bicycle model that takes into consideration the tire sideslip angle or a multi-degree-of-freedom model that adds even more precise effects of vertical movement can be used. The higher the accuracy of the model is, the smaller a deviation from prediction is, and the fine steering correction by the feedback control decreases. Therefore, the steering profile as a result of actual travel becomes closer to a sinusoidal shape and smooth steering is achieved.

Second Embodiment

According to the first embodiment, it is necessary to search for the target path online. According to the second embodiment of the present invention, a procedure for calculating the target path by referring to a correspondence relationship mapped in advance on the basis of offline calculation will be described. The other configurations are the same as those in the first embodiment.

The present invention is directed to the vehicle movement in the lane changing mode, and the number of input parameters necessary for defining the steering profile is limited. Therefore, in the second embodiment, the final lateral position and yaw angle for the steering profile are obtained by referring to the map previously prepared.

More specifically, for example, a plurality of patterns of combinations of four parameters of the avoidance distance, the lateral movement amount, and the vehicle speeds at the start point and end point of the lane change path are set by using discrete values, and the sinusoidal steering profile for reducing each of the peak values of the resultant accelerations of longitudinal and lateral accelerations is obtained beforehand for all the set combinations. Actually, since the respective input parameters take continuous values, a continuous four-dimensional map is created by interpolating data points on the basis of neighboring values set as the discrete values. On the basis of this map, the steering profile and the travel path are obtained, and the feedforward control based on the steering profile is compensated by the feedback control.

The target path can also be calculated by setting a passing point on the way. When the lane change path is set to level the peak values of the resultant accelerations of longitudinal and lateral accelerations, the target path deviates outward compared with the point-symmetric path in the lane change made while decelerating, and the target path deviates inward in the lane change made while accelerating. Use of this feature allows setting a target passing point at the midpoint of the lane change path outside or inside the point symmetric path and controlling steering to pass through the point.

Figure 19:
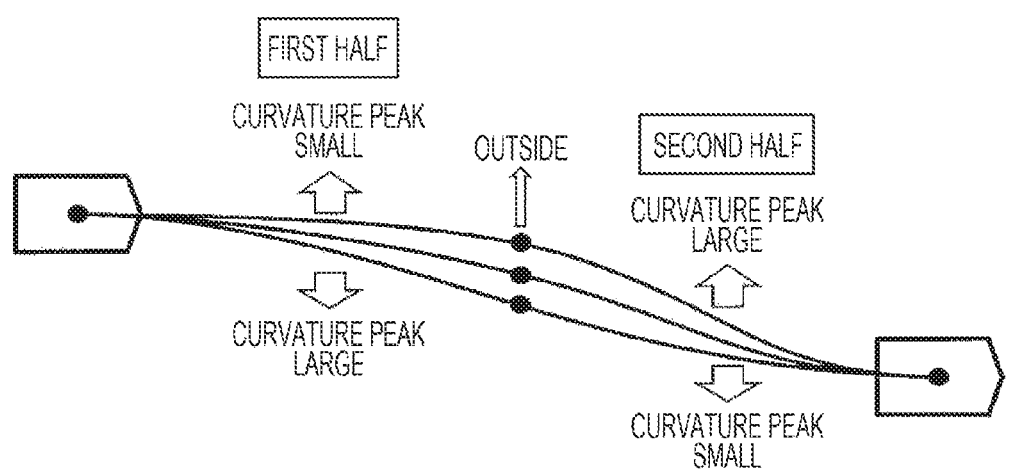
FIG. 19 is a diagram illustrating relationships between passing point positions on lane change paths and curvatures of the lane change paths.

FIG. 19 is a diagram illustrating relationships between passing point positions on the lane change paths and curvatures of the lane change paths. In the travel path where the left turn and the right turn are made once, when the target pass point is set outside, the peak value of the curvature in the first half is smaller than that of the second half, and when the target pass point is set inside, the peak value of the curvature in the second half is smaller than that in the first half.

(1) the position of the start point, (2) the traveling direction at the start point, (3) the position of the passing point, (4) the position of the end point, and (5) the traveling direction at the end point are defined as input parameters so that a lateral position y of the path are expressed by a function with a longitudinal position x as an argument. For example, by defining the function as a quartic function $y=ax^4+bx^3+cx^2+dx+e$, a quartic function satisfying the above five input parameters are uniquely defined, and a calculation load can be reduced. Furthermore, the continuity of the curvature can be maintained by matching the traveling direction at the start point with the traveling direction of the predefined path up to immediately before the start point and by matching the traveling direction at the end point with the traveling direction of the predefined path from immediately after the end point.

Furthermore, when (6) the rate of change in the curvature of the path at the start point is matched with the rate of change in the curvature of the predefined path up to immediately before the start point and (7) the rate of change in the curvature of the path at the end point is matched with the rate of change in curvature of the predetermined path immediately after the end point, it is possible to uniquely determine the travel path having a sixth-order function shape satisfying these seven input parameters. Thus, a change in the curvature continues, and by applying the G-Vectoring control, the resultant acceleration of longitudinal and lateral accelerations smoothly transitions, and ride comfort is improved.

To determine to what extent the target passing point is shifted to the outside or inside relative to the point-symmetric path, a map for reference can be prepared in advance in which the target passing points are defined for four input parameters of the avoidance distance, the lateral movement amount, and the vehicle speeds at the start point and the end point of the lane change path.

Third Embodiment

The travel path described in the above embodiments may be combined with dynamic path generation other than the lane changing mode. In Embodiment 3 according to the present invention, an example of the combination will be described.

When the end point of the lane change path set according to the present invention is on the predetermined travel path, lane change control is finished when the lane change reaches the end point, and travel control following the predetermined path is restored. When the end point of the lane change path set according to the present invention is not on the predetermined travel path, it is necessary to generate a path in front of the lane change path. In this case, the vehicle movement control device 15 determines again whether traveling in the lane changing mode is necessary, on the basis of the surrounding situations. At this time, when returning to the predetermined path by using the travel path in the lane changing mode, the end point of the lane change is preferably set on the predetermined path.

When steering not in the lane changing mode is required, the vehicle travels using a path curving only in one direction, that is, to the left or to the right, and returns to the predetermined static travel path. Alternatively, going straight ahead or turning to the right or left is caused to be continued until the lane changing mode is suitably applied. When the G-Vectoring control is also applied to the turning in one direction, the steering speed is desirably continued so that the longitudinal acceleration according to the steering is smoothly changed, as in the zone which is set to the lane changing mode.

<Regarding Modifications of the Present Invention>

The present invention is not limited to the examples described above, and may include various modifications. For example, the above examples are described in detail for ease of understand the present invention, and therefore, the present invention is not necessarily limited to all configurations described above. Furthermore, part of a configuration according to an example may be replaced with a configuration according to another example, and further a configuration according to an example may be applied to a configuration according to another example. Still furthermore, for part of the configurations according to the respective examples, additions, eliminations, or substitutions of another configuration may be made.

In the above embodiment, a description is made of improvement of the ride comfort and the vehicle dynamic performance by application of the G-Vectoring control, in any of traveling on the path of FIG. 9 (point symmetric path) or traveling on the path of FIG. 12 (present invention). Instead of this description, when only $G_{x\_DC}$ is given in formula 1, the longitudinal acceleration is constant regardless of the lateral movement, and the "g-g" diagram has a flat shape, unlike in FIG. 10 and FIG. 13. Even in this case, since the peak values of the resultant accelerations of longitudinal and lateral accelerations are different between right and left turns, in the point symmetric path, application of the present invention can level the peak values of the resultant accelerations between the left and right turning, improving the ride comfort.

In the above embodiment, the example in which the travel path is obtained by using a polynomial expression has been described, but the present invention is not limited to this example, and, for example, by setting a necessary and sufficient constraint condition for a combination with a general function, such as a sine wave, to obtain the travel path.

Since the travel path generated by the vehicle movement control device 15 according to the present invention is a path generated up to the end point of the lane change before changing lane. Therefore, for example, when an object to be avoided makes a different movement from a predicted movement and the possibility of contact is generated, the path has to be changed in the middle of traveling along the travel path calculated beforehand. In this case, a peak value of a resultant acceleration of longitudinal and lateral accelerations is not always minimized. This is because when the degree of acceleration/deceleration or the steering angle is increased, the resultant acceleration of longitudinal and lateral accelerations increases. However, by generating the travel path in advance so as to reduce the peak value of the resultant acceleration of longitudinal and lateral accelerations, an allowance to the friction limit of tire and road surface is sufficiently secured, so even if the resultant acceleration of longitudinal and lateral accelerations increases, the risk of the deviation from the path or unstable vehicle behavior is considered to be reduced as compared with a case where the present invention is not applied.

In the above embodiments, use of the sinusoidal steering profile or the travel paths having a quartic function shape and the sixth-order function shape has been described. By using these profiles, the larger the longitudinal travel distance (avoidance distance) from the start point to the end point of the lane change is, the smaller the maximum value of the steering angle or the steering speed is, and the smaller the lateral movement amount from the start point to the end point of the lane change is, the smaller the maximum value of the steering angle or the steering speed is. Thus, the peak value itself of the resultant acceleration of longitudinal and lateral accelerations reduces, and a burden on the occupant can be reduced. As long as the peak value itself of the resultant acceleration of longitudinal and lateral accelerations can be reduced, another steering profile or travel path may be used.

The configurations, functions, processing units, processing means, or the like described above may be partially or wholly achieved by hardware, for example, by being designed by an integrated circuit. In addition, each of the above-described configurations, functions, and the like may be achieved by software through interpreting and executing a program for achieving each function by a processor. Information such as programs, tables, files which achieve functions can be stored in a storage medium, such as memory, hard disk, and solid state drive (SSD) or a recording medium, such as IC card, SD card, or DVD.

REFERENCE SIGNS LIST 1 vehicle
11 left front wheel
12 right front wheel
13 left rear wheel
14 right rear wheel
15 vehicle movement control device
16 inertial sensor
17 GNSS sensor
18 steering device
19 drive device
20 brake control device
21 brake device (left front wheel)
22 brake device (right front wheel)
23 brake device (left rear wheel)
24 brake device (right rear wheel)
25 decelerator
26 drive shaft
27 steering angle sensor
28 camera
29 side image sensor
30 laser scanner
31 wheel speed sensor (left front wheel)
32 wheel speed sensor (right front wheel)
33 wheel speed sensor (left rear wheel)
34 wheel speed sensor (right rear wheel)

The invention claimed is:

1. A vehicle movement control device disposed within a vehicle for controlling steering and acceleration/deceleration of the vehicle, the device comprising:
   a non-transitory computer-readable medium storing a computer program therein, which, when executed causes the control device to perform operations comprising:
   calculating a travel path for the vehicle;
   controlling a steering angle of the vehicle according to the travel path; and
   controlling acceleration of the vehicle according to the travel path,
   wherein when calculating the travel path to cause the vehicle to turn to a first direction or a second direction and then turn to the other of the first or second direction, the travel path is calculated so that a peak value of a curvature of the travel path decreases in a section where a vehicle speed is higher than outside the section;
   wherein controlling acceleration of the vehicle comprises controlling the longitudinal acceleration of the vehicle according to lateral movement of the vehicle; and
   wherein controlling acceleration of the vehicle causes the vehicle to decelerate when an absolute value of a lateral acceleration acting on the vehicle increases, and causes the vehicle to accelerate when an absolute value of lateral movement of the vehicle decreases.

2. The vehicle movement control device according to claim 1, wherein the control device is configured to:
   control a longitudinal acceleration so that the vehicle speed of differs between turning of the vehicle to the first direction or the second direction and subsequent turning of the vehicle to the other of the first or second direction in the travel path,
   calculate a difference between a first maximum value of a resultant acceleration of longitudinal and lateral accelerations of the vehicle while the vehicle turns to the first direction or the second direction and a second maximum value of the resultant acceleration of longitudinal and lateral accelerations of the vehicle while the vehicle turns to the other of the first or second direction, and
   calculate the travel path so that the difference between the first maximum and the second maximum is smaller than an acceleration when the vehicle turns in a first direction or a second direction along a point-symmetric path.

3. The vehicle movement control device according to claim 1, wherein the control device is configured to:
   calculate the travel path so that a distance in which the vehicle travels during a period between a start of turning the vehicle to one of the first direction or the second direction and an end of turning the vehicle to the other of the first or the second side continuously in the travel path increases as a maximum value of a steering angle or a steering speed while the vehicle travels along the travel path decreases.

4. The vehicle movement control device according to claim 1, wherein the control device is configured to:
   calculate the travel path so that as a lateral movement amount of the vehicle during a period between a start of turning the vehicle to one of the first direction or the second direction and an end of turning the vehicle to the other of the first or the second side continuously in the travel path increases, a maximum value of a steering angle or a steering speed while the vehicle travels along the travel path decreases.

5. The vehicle movement control device according to claim 1, wherein the control device is configured to:
   calculate the travel path so that the steering angle of the vehicle changes sinusoidally during turning of the vehicle to the the first direction and the second direction, and during subsequent turning of the vehicle to the other of the first direction or the second direction continuously.

6. The vehicle movement control device according to claim 1, wherein the control device is configured to:
calculate the travel path to cause the vehicle to turn to one of the first direction or the second direction and then subsequently turn to the other of the first or second direction by using a curve represented by a quartic function.

7. The vehicle movement control device according to claim 1, wherein the control device is configured to:
calculate the travel path so that a rate of change in curvature of the travel path remains unchanged.

8. The vehicle movement control device according to claim 7, wherein the control device is configured to:
calculate the travel path to cause the vehicle to turn to one of the first direction or the second direction and then turn to the other of the first or second direction by using a curve represented by a sixth-order function.

9. A vehicle movement control method for controlling steering and acceleration/deceleration of a vehicle, the method comprising:
a path generation step of calculating a travel path for the vehicle;
a steering angle control step of controlling a steering angle of the vehicle according to the travel path; and
an acceleration control step of controlling acceleration of the vehicle according to the travel path,
wherein in the path generation step, when calculating the travel path to cause the vehicle to turn to one of a first direction or a second direction and then turn to the other of the first direction or the second direction, the travel path is calculated so that a peak value of a curvature of the travel path decreases in a section where the vehicle speed is higher than outside the section;
wherein controlling acceleration of the vehicle comprises controlling the longitudinal acceleration of the vehicle according to lateral movement of the vehicle;
wherein a rate of change in curvature of the travel path remains unchanged when calculating the travel path; and
wherein calculating the travel path causes the vehicle to turn to one of the first direction or the second direction and then turn to the other of the first or second direction by using a curve represented by a sixth-order function.

10. A vehicle movement control program for causing a vehicle movement control device to execute a control calculation for controlling steering and acceleration/deceleration of a vehicle, the program causing the vehicle movement control device to execute:
a path generation step of calculating a travel path for the vehicle;
a steering angle control step of calculating a control command for controlling a steering angle of the vehicle according to the travel path; and
an acceleration control step of calculating a control command for controlling acceleration of the vehicle according to the travel path,
wherein in the path generation step, when causing the vehicle movement control device the travel path to cause the vehicle to turn to one of a first direction or a second direction and then turn to the other of the first direction or the second direction, the vehicle movement control device is caused to calculate the travel path so that a peak value of a curvature of the travel path decreases in a section where the vehicle speed is higher than outside the section;
wherein controlling acceleration of the vehicle comprises controlling the longitudinal acceleration of the vehicle according to lateral movement of the vehicle; and
wherein controlling acceleration of the vehicle causes the vehicle to decelerate when an absolute value of a lateral acceleration acting on the vehicle increases, and causes the vehicle to accelerate when an absolute value of lateral movement of the vehicle decreases.

11. The vehicle movement control program of claim 10, wherein the longitudinal acceleration is determined by G-vectoring control, wherein the longitudinal acceleration is calculated based on a lateral acceleration, a rate of change of the lateral acceleration, a control gain, and a component of the longitudinal acceleration that is independent of the lateral movement of the vehicle.

* * * * *